UNITED STATES PATENT OFFICE.

PAUL LACHENMEYER, OF LANSDOWNE, PENNSYLVANIA.

PROCESS OF PRODUCING STIPPLED PHOTOGRAPHIC RECORDS.

1,046,089.  Specification of Letters Patent.  Patented Dec. 3, 1912.

No Drawing.   Application filed April 14, 1910. Serial No. 555,416.

*To all whom it may concern:*

Be it known that I, PAUL LACHENMEYER, a citizen of the United States, residing at Lansdowne, county of Delaware, State of Pennsylvania, have invented a new and useful Process of Producing Stippled Photographic Records, of which the following is a specification.

This invention relates to a process or method of chemically producing a stippled, grained dotted or interrupted image, picture tint, or surface by subjecting silver and silver compounds, existing as a homogeneous surface, and as in a photographic record, to the action of metallic cyanid solutions containing or acting in the presence of solvents of the complex metallic cyanids. Heretofore it has been possible in practice to produce such an image picture tint, or surface by physical or mechanical means only, the method being expensive and taking considerable time.

In my present process by varying the kind of chemicals used and also the relative proportions of the same to each other, a stippled, grained dotted or interrupted image, picture, tint or surface may be produced, consisting of regular or irregular dots, dashes or crystalline forms of various sizes and shapes, lying isolated or adjacent or touching or overlying one another with the spaces between free of metallic deposits, as the case may be.

The method consists in transforming, transmuting and changing the chemical and physical nature of the image, picture tint, or surface from its then present condition to that of a like grained, dotted interrupted or stippled image, picture, tint or surface.

In carrying out my process a solution of an oxidizing reagent is utilized, and this mixture or solvent matter consists of a solution of a metallic cyanid acting in the presence of an alkali or else in the presence of a solvent of the complex metallic cyanids. By a solution of metallic cyanid I desire it understood that I may employ ferricyanid of potassium, or other metallic cyanid, by an alkali I mean such alkali as ammonium hydrate and by a solvent of the complex metallic cyanids, I mean such a compound as ammonium thiosulfate and I employ preferably ferricyanid of potassium and ammonium hydrate, as these are the chemicals which I have found to work most energetically, and satisfactorily, although it will of course be understood that I do not wish to be limited specifically to these two, as various other chemicals may be used within the scope of my invention three of which I have specified above as typical.

In carrying out my novel process the chemicals selected are mixed in suitable proportions, such as for example, when used on photographic negatives, I may take 90 cubic centimeters of one and one-half per cent., aqueous solution of ferricyanid of potassium and add thereto 20 cubic centimeters of ammonium hydrate, specific gravity .90, although it will be understood that these proportions may be varied and it being noted that the proportion of the chemicals one to the other, determines the locality, nature, shape, size, color, opacity, and number of the dots, dashes, stipples or grains and also determines the length of time necessary to accomplish the change from the original state of the image, picture tint to the other state or condition. The image, picture tint, or surface, upon its support is then treated with the solution or mixture and the resulting action destroys the physical and chemical nature of the constituents of the original image, picture tint or surface, replacing and substituting for such constituents other compounds in the shape of regular or irregular dots, dashes, stipples, grains or crystalline forms. When the original nature of the image, picture tint, or surface is entirely destroyed, all of the dots, dashes and the like will have been formed, placed and deposited and the action is complete. The next step consists of washing the resultant image, picture tint, or surface upon its support to remove all the soluble chemicals, which washing may be accomplished by destroying by chemical means the by-products of the reaction, then it may be found that the dots, stipples and the like which have been formed are not sufficiently opaque to permit the use of the grained image, picture tint, or surface in the commercial photo engraving and printing arts. If it is found that they are not sufficiently opaque they can be intensified, added to or chemically changed by means of various chemicals that will intensify, add to, or chemically change them to meet the required necessities.

In the intensification process acid solutions of metallic salts as of iron, copper or uranium, or alkaline sulfids and various photographic developers may be used and in practice have been found to give desirable results. Other means may be also utilized in order to intensify, darken or render the in dots, etc., opaque, such as rubbing or rolling over the surface various compounds, either in free powder, solid form or in a mixture with oily, greasy or waxy mediums or as an emulsion or solution. The entire method is particularly adapted and intended principally for the production of an image, picture tint or surface to be used in connection with reproductive printing processes, either directly or indirectly.

It will now be apparent that I have devised a novel and useful process embodying the features of advantage enumerated in the statement of invention and the above description, and while I have, in the present instance, shown and described the preferred embodiment thereof which has been found in practice to give satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent, is:—

1. The process of making a stippled, grained, dotted or interrupted image, picture, tint or surface which consists in subjecting silver, silver compounds, or silver and silver compounds, existing as a homogeneous surface, and as in a photographic record, to the action of a solution of an oxidizing reagent containing or acting in the presence of further solvents of the complex metallic compounds thereby produced.

2. The process of making a stippled, grained, dotted or interrupted image, picture, tint or surface which consists in subjecting silver, silver compounds or silver and silver compounds, existing as a homogeneous surface, and as in a photographic record, to the action of a metallic cyanid solution, containing or acting in the presence of solvents of the complex metallic cyanids thereby produced.

3. The process of making a stippled, grained, dotted or interrupted image, picture, tint or surface which consists in subjecting silver, silver compounds and silver or silver compounds, existing as a homogeneous surface, and as in a photographic record, to the action of a solution of an oxidizing reagent containing or acting in the presence of further solvents of the complex metallic compounds thereby produced, then washing the image, picture, tint or surface to remove the soluble chemicals and the by-products of the reaction, and then subjecting the resulting image, picture, tint or surface to the action of an intensifying agent capable of combining with nuclei produced in the image, picture, tint or surface to increase their opacity to actinic rays.

4. The process of making a non-homogeneous photographic representation for the purpose stated, which consists in subjecting the exposed homogeneous surface of a coating containing metallic compounds, as in a photographic record to the action of a solution of an oxidizing reagent and to the additional action of solvents of the complex metallic compounds produced by the combination of the metallic salts of the oxidizing reagent solution with the metallic salts of the sensitive coating.

PAUL LACHENMEYER.

Witnesses:
C. D. McVay,
M. E. Rinkenbach.